United States Patent [19]

Demski

[11] Patent Number: 5,020,264
[45] Date of Patent: Jun. 4, 1991

[54] HOLDER FOR A FISHING HOOK, LINE, LEADER OR SINKER

[76] Inventor: Felix Demski, 4230 Linville Dr., Warren, Mich. 48092

[21] Appl. No.: 389,493

[22] Filed: Aug. 4, 1989

[51] Int. Cl.$^5$ .............................................. A01K 97/06
[52] U.S. Cl. ....................................... 43/25.2; 43/57.1
[58] Field of Search ................. 43/25, 25.2, 54.1, 57.1

[56] References Cited

U.S. PATENT DOCUMENTS

| | | | |
|---|---|---|---|
| 2,878,610 | 3/1959 | Herstedt | 43/25.2 |
| 2,993,293 | 7/1961 | Blout | 43/25.2 |
| 3,086,312 | 4/1963 | Davis . | |
| 3,141,258 | 7/1964 | Mayer . | |
| 3,199,243 | 8/1965 | Caston | 43/25.2 |
| 3,430,379 | 3/1969 | Wolfrum . | |
| 3,800,456 | 4/1974 | Rowe . | |
| 3,940,873 | 3/1976 | Lawless | 43/57.1 |
| 4,015,361 | 4/1977 | O'Reilly | 43/54.1 |
| 4,081,923 | 4/1978 | Pruncutz . | |
| 4,121,368 | 10/1978 | Norwood . | |
| 4,203,245 | 5/1980 | Peterson | 43/25.2 |
| 4,418,490 | 12/1983 | Ancona | 43/57.1 |
| 4,441,274 | 4/1984 | Masur | 43/25.2 |
| 4,452,003 | 6/1984 | Deutsch | 43/57.1 |
| 4,597,216 | 7/1986 | Bjorshol . | |
| 4,614,054 | 9/1986 | Fovenyessy . | |
| 4,667,433 | 5/1987 | Thompson | 43/25.2 |
| 4,831,772 | 5/1989 | Gillespie | 43/25 |

FOREIGN PATENT DOCUMENTS

| | | | |
|---|---|---|---|
| 732817 | 4/1966 | Canada | 43/25.2 |

Primary Examiner—Kurt Rowan
Attorney, Agent, or Firm—Gifford, Groh, Sprinkle, Patmore and Anderson

[57] ABSTRACT

A holder for a fishing hook, line, leader or the eye of a sinker comprises a pliable holder body having a plurality of hook fasteners at one end and a plurality of loop fasteners at the other end whereby the hook, line, leader or sinker is held between said hooks and loops when fastened together. The interstices between the meshed hooks and loops allows the hook, line, leader or sinker to air dry after use. The body portion include a longitudinal shot defined therein for accomodation of a fishing line guide mounted on a rod. When placed about a fishing rod in its holding position with the line guide being fitted through the slot, the holder's axial movement along the fishing rod is restrained.

11 Claims, 1 Drawing Sheet

U.S. Patent  June 4, 1991  5,020,264
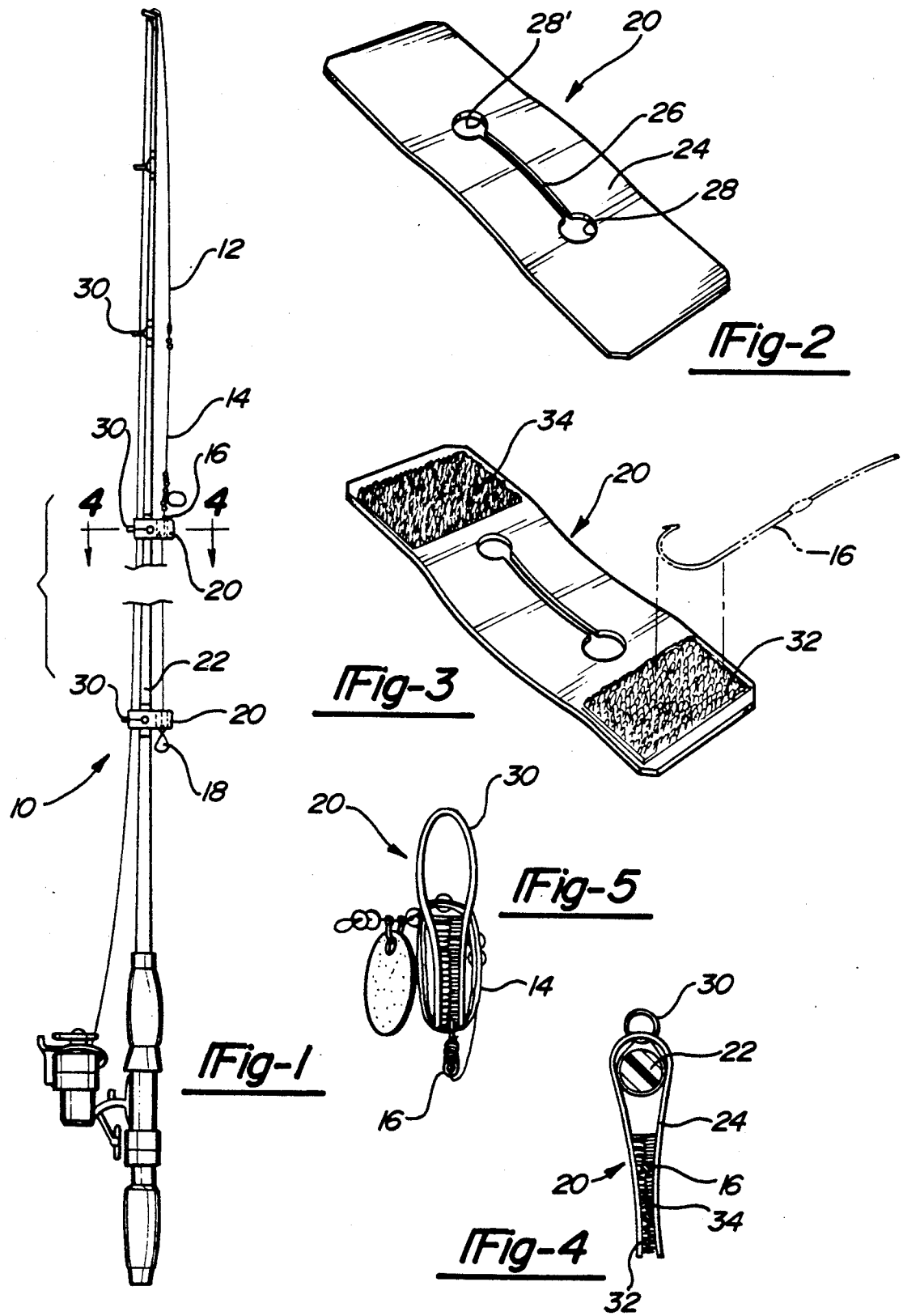

HOLDER FOR A FISHING HOOK, LINE, LEADER OR SINKER

BACKGROUND OF THE INVENTION

I. Field of the Invention

The present invention relates generally to holders for fishing hooks, lines, leaders or sinkers. More particularly, the present invention relates to such a holder having a pliable body which includes two removably attachable ends whereby the fishing hook, line, leader or the eye of a sinker is removably held therebetween.

II. Description of the Relevant Art

The sport of fishing is popular and well-known and is directed at sport fishing and leisure fishing and all of the fishing in between.

The equipment used by people who fish is generally the same, although differing greatly in cost and quality. The primary piece of fishing equipment is the rod with its associated reel.

Regardless of the cost or quality of the rod and reel, one common scourge affects both sport and leisure fishing: the unwieldly fishing line, leader, hook and sinker. The line becomes easily tangled and the hook is dangerous because of the difficulty of extracting a barb once hooked. Simply unwinding the line onto the reel until the hook (or the hook snap) contacts the top or end ring of the rod may reduce somewhat the problem of the hook, but does nothing to eliminate or reduce the problem of a loose and unanchored sinker.

In an effort to resolve this problem, some participants in the sport tie or wrap the line or leader around the rod. This, however, often results in hopeless entanglement. Giving in, many participants in the sport simply remove the hook and the sinker and sometimes the leader. While this eliminates the possibility of entangling or hooking, this approach is inconvenient and inefficient.

Accordingly, prior approaches to providing an answer to the problems of unwieldly lines, leaders, hooks and sinkers have generally failed.

SUMMARY OF THE PRESENT INVENTION

The present invention provides a holder for a fishing hook, line, leader or the eye of a sinker. The holder comprises a pliable body portion composed of a waterproof material. The body portion has two ends. At one end are fitted a plurality of hooks and at the other end are fitted a plurality of loops. This construction allows for removable attachment of the two ends to each other. The body portion is wrappable around a rod before attachment of the two ends.

Between the two ends and before the inter-attachment thereof, any one of a hook, line, leader or the eye of a sinker is emplaced. When the two ends are attached, the hook, line, leader or eye of the sinker is held in place. The barbed and bent part of the hook is completely covered by the holder, being fitted soundly between the two ends of the cover, thereby protecting persons and things from damage.

Because the hooks and loops include interstices when interlocked, circulating air allows for the drying thereof so that the equipment may be held immediately after use.

The body portion preferably includes a longitudinal slot defined therein for accomodation of a fishing line guide. When placed about a fishing rod in its holding position with the line guide being fitted through the slot, the holder's axial movement along the fishing rod is restrained.

Accordingly, one or more of the holders may be used on a rod concurrently, some wrapped about the guide and some not, and the equipment may be properly secured thereby. One may use, for example, a holder on the line, the leader, the hook or the eye of the sinker.

Beyond the obvious aspects, the present invention also offers the multiple advantages of being of light weight construction, waterproof (and therefore shrinkproof), and of low cost.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiments of the present invention when read in conjunction with the accompanying drawing, in which like reference characters refer to like parts throughout the views, and in which:

FIG. 1 is a side view of a fishing rod with the holder of the present invention in place thereon;

FIG. 2 is a perspective view illustrating the outer side of the holder of the present invention;

FIG. 3 is a perspective view illustrating the inner side of the holder of the present invention;

FIG. 4 is a view taken along lines 4—4 of FIG. 1; and

FIG. 5 is a side view illustrating an alternate use of the present invention.

DETAILED DESCRIPTION OF THE PREFERRED EMBODIMENTS OF THE PRESENT INVENTION

The drawing discloses the preferred embodiments of the present invention. While the configuration according to the illustrated embodiments are preferred, it is envisioned that alternate configurations of the present invention may be adopted without deviating from the invention as portrayed. The preferred embodiments are discussed hereafter.

Referring to FIG. 1, a fishing rod, generally indicated as 10, is illustrated. The fishing rod 10 includes a fishing line 12, a leader 14, a hook 16, and a sinker 18.

The holder according to the present invention appears on the rod more than once as a holder 20. The holders 20 may be fitted around a rod body 22 of the fishing rod 10 as illustrated. The holders 20 are shown as holding the hook 16 and the eye of the sinker 18. The holders 20 may be used to hold the line 12 or the leader 14 additionally.

Referring to FIG. 2, a perspective view of the outer side of the holder 20 is illustrated. The holder 20 includes a body 24 that is preferably composed of a waterproof pliable material such as a vinyl or a plastic.

As a preferred embodiment, a slot 26 is defined longitudinally in the body 24. The ends of the slot 26 terminate in a pair of apertures 28, 28'. The apertures 28, 28' are provided to prevent the length of the slot 26 from becoming longer by tearing through use.

Referring back to FIG. 1, although the holder 20 may be made and used without the slot 26, the slot 26 provides the added advantage of allowing the holder to be wrapped about the rod body 22 at the point where a line guide 30 is mounted. By so fitting, the holder 20 is prevented by the guide 30 from moving axially along the length of the rod body 22. Accordingly, the line 12 may remain taut.

Referring to FIG. 3, the underside of the holder 20 is illustrated. This view best discloses the attachments provided at each end of the body 24 of the holder 20. As illustrated, the body has fitted thereto (by sewing or adhesives) a matting of a plurality of hooks 32 and a matting of a plurality of loops 34. The hook 16 (or line 12, leader 14 or the eye of the sinker 19) may be placed upon one or the other of the matting 32 or 34 and the two ends are attached to one another thereafter.

While the mattings 32, 34 are illustrated as being composed of hooks and loops, other removably attachable mattings may be employed.

Referring to FIG. 4, a cross section view of the rod body 22 having the holder 30 fitted thereabout is illustrated. The hook 16 may be seen also in cross section as being held between the mattings 32 and 34.

When the mattings 32, 34 are intermeshed as illustrated, a plurality of interstices remain whereby a current of air may pass therethrough to dry the line 12, the leader 14, the hook 16 or the eye of the sinker 18.

Referring to FIG. 5, a side view of the holder 30 is illustrated as having a different use from that disclosed in FIGS. 1-4 and described above with respect thereto. According to this application, the user may insert the hook 16 into the holder as described with respect to FIGS. 1-4 then wrap the leader 14 about the holder 30, passing the leader 14 through the slot 26. This use of the holder 30 allows the user to comfortably, safely and conveniently carry a fishing hook without risk of either tangling the line or being hooked or barbed. The user may thus place the holder 30 and its associated leader 14 and hook 16 in a pocket.

Having described my invention, however, many modifications thereto will become apparent to those skilled in the art to which it pertains without deviation from the spirit of the invention as defined by the scope of the appended claims.

I claim:

1. A holder for a fishing hook, the eye of a sinker, a fishing line leader or a fishing line, said holder comprising:
    a bendable body portion having a first end and a second end and having a longitudinal axis;
    said body portion including means for removably attaching said first end to said second end;
    said means for removably attaching being movable from one of a connectably attached position to a disconnected position;
    said means for removably attaching being partially porous when in said attached position whereby gas is allowed to pass therethrough; and
    means for accommodating a fishing line guide of a fishing rod comprising a slot longitudinally defined in said body portion.

2. The holder of claim 1 wherein said body portion is composed of a pliable material.

3. The holder of claim 1 wherein said body portion is composed of a waterproof material.

4. The holder of claim 1 wherein said slot has a first end and a second end, said first and second ends terminating at apertures defined in said body portion.

5. The holder of claim 1 wherein said means for removably attaching comprises a material provided on said first end being removably attachable to a material provided on said second end whereby a hook, line, leader or the eye of a sinker is removably held in place therebetween.

6. The holder of claim 5 wherein said material on said first end and said material on said second end, when intermeshed, allow for the passage of air therethrough.

7. The holder of claim 6 wherein said material on said first end comprises a plurality of hook fasteners and said material on said second end comprises a plurality of loop fasteners.

8. A holder for a fishing hook, the eye of a sinker, a fishing line leader or a fishing line, said holder comprising:
    a body portion having a longitudinal axis; and
    a fastener fixed to said body portion whereby said hook, said eye of said sinker, said leader or said line may be removably held thereby;
    said fastener comprising a material on said first end being removably attachable to a material provided on said second end whereby said hook, line, leader or sinker is removably held in place therebetween;
    said material on said first end comprising a plurality of hook fasteners and said material on said second end comprising a plurality of loop fasteners;
    whereby a gas is allowed to circulate substantially through the interstices resulting between said hook fasteners and said loop fasteners when interconnected; and
    means for accommodating a fishing line guide of a fishing rod comprising a slot longitudinally defined in said body portion.

9. The holder of claim 8 wherein said slot has a first end and a second end, said first and second end terminating at apertures defined in said body portion.

10. A holder for a fishing hook, the eye of a sinker, a fishing line leader or a fishing line, said holder comprising:
    a body portion composed of a pliable material, said body portion having a first end and a second end;
    means for releasably attaching said first end to said second end;
    said body portion being wrappable about a fishing rod;
    said means for releasably attaching comprising a hook fastener surface having a plurality of hooks thereon and a loop fastener surface having a plurality of loops thereon, said fastener surfaces being releasably attachable between a first attached position to a second detached position;
    said plurality of hooks and said plurality of loops having interstices therebetween when in said attached position;
    whereby air is allowed to circulate substantially between said hook fastener surface and said loop fastener surface; and
    means for accommodating a fishing line guide of a fishing rod comprising a slot longitudinally defined in said body portion.

11. The holder of claim 10 wherein said plurality of hook fasteners is provided on said first end and said plurality of loop fasteners is provided on said second end.

* * * * *